United States Patent [19]

Tohbaru

[11] Patent Number: 5,309,138
[45] Date of Patent: May 3, 1994

[54] VEHICLE COLLISION DETECTING METHOD EMPLOYING AN ACCELERATION SENSOR

[75] Inventor: Shigeo Tohbaru, Saitama, Japan

[73] Assignee: Honda Giken Kogyo Kabushiki Kaisha, Tokyo, Japan

[21] Appl. No.: 852,629

[22] Filed: Mar. 17, 1992

[30] Foreign Application Priority Data

Mar. 19, 1991 [JP] Japan .................................. 3-055138
Sep. 3, 1991 [JP] Japan .................................. 3-222611

[51] Int. Cl.⁵ .............................................. B60Q 1/00
[52] U.S. Cl. ........................................ 340/436; 340/669
[58] Field of Search ....................... 340/436, 438, 669; 280/735; 180/282

[56] References Cited

U.S. PATENT DOCUMENTS

| | | | |
|---|---|---|---|
| 3,762,495 | 10/1973 | Usui et al. | 180/103 |
| 4,381,829 | 5/1983 | Montaron | 340/436 X |
| 4,975,850 | 12/1990 | Diller | 340/436 X |
| 4,985,835 | 1/1991 | Sterler | 340/669 X |
| 4,994,972 | 2/1991 | Diller | 180/282 X |
| 5,021,678 | 6/1991 | Diller | 340/436 X |
| 5,040,118 | 8/1991 | Diller | 340/436 X |
| 5,067,745 | 11/1991 | Yoshikawa | 280/735 |

FOREIGN PATENT DOCUMENTS 59-8574 2/1984 Japan .

Primary Examiner—Hezron E. Williams
Assistant Examiner—Christine K. Oda
Attorney, Agent, or Firm—Armstrong, Westerman, Hattori, McLeland & Naughton

[57] ABSTRACT

A collision detecting method for detecting a collision of a vehicle on the basis of an acceleration signal produced by an acceleration sensor. A reduction in the amount of speed of the vehicle due to the collision from an acceleration signal is estimated by an acceleration signal from the acceleration sensor and by a rate of time variation in the acceleration signal, and the collision of the vehicle is detected when the amount of deceleration exceeds a predetermined value. In addition, the collision of the vehicle is detected, when an integration value resulting from an integration of the acceleration signal over a first period of time exceeds a predetermined value, and when a differentiation value of the acceleration signal exceeds a predetermined value. The collision detecting method can be used to operate a collision safety device (such as, an air bag system and a belt retracting system) within an extremely short time after occurrence of the collision.

18 Claims, 10 Drawing Sheets

VEHICLE COLLISION DETECTING METHOD EMPLOYING AN ACCELERATION SENSOR

BACKGROUND OF THE INVENTION

1. Field of the Invention

The present invention is generally related to vehicle collision detecting methods by which a collision safety device (such as, an air bag system and a belt retracting system) is properly started.

2. Description of the Related Art

In an air bag system for protecting an occupant from a secondary collision damage upon collision of a vehicle, if only an acceleration signal which an acceleration sensor outputs as a starting or triggering signal for the air bag system is used, there is a possibility that a starting signal may be outputted when a small object which will not substantially damage a vehicle body collides against a portion of the vehicle near where the acceleration sensor is located. Therefore, means for preventing this is required.

Further, the air bag system is required to be operated not only when a collision with a large shock occurs, but also when a collision with a small but continuously long shock occurs. In such a case, however, there is a possibility that the starting signal may not be produced by the acceleration sensor and hence, means for compensating for this is required.

In order to avoid the above-discussed problems, a collision detecting method has been proposed having the step of calculating a speed found by integration of an acceleration produced by an acceleration sensor (i.e., a secondary collision speed at which an occupant moves, for example, toward a steering wheel under an action of an inertia due to a collision) so that if the secondary collision speed exceeds a predetermined value, a starting signal for an air bag system is produced (see, Japanese Patent Publication No. 8574/84).

In the above-described conventional method, however, when a collision with a small and continuously long shock occurs, a fairly long time may lapse from an instant of collision until the starting signal for the air bag system is produced; thereby, resulting in a possibility of some deviation in the timing for the start of the air bag system.

SUMMARY OF THE INVENTION

Accordingly, it is an object of the present invention to provide a collision detecting method wherein a proper detection of collision can be effected within an extremely short time after an occurrence of a collision.

In order to achieve the above object, according to a first aspect and feature of the present invention, there is provided a collision detecting method for detecting a collision of a vehicle on the basis of an acceleration signal produced by an acceleration sensor, including the step of estimating an amount of deceleration of the vehicle due to the collision by an acceleration signal from the acceleration sensor and a rate of time variation in the acceleration signal so that the collision of the vehicle is detected when the amount of deceleration exceeds a predetermined value.

With the first feature of the invention, the amount of deceleration of a vehicle body due to the collision can be estimated by detecting an acceleration immediately after the collision of the vehicle. Therefore, the collision of the vehicle can be determined at an extremely early time after occurrence of the collision by comparing the amount of deceleration with a reference value. Consequently, when a collision safety device is operated on the basis of such a detection of the collision, it is possible to produce the starting signal for the collision safety device at an early stage with respect to a time required for the operation of the collision safety device; thereby, allowing the collision safety device to accomplish its function.

If the acceleration from the acceleration sensor is used for estimating the amount of deceleration of the vehicle body after the acceleration signal has passed through a low-pass filter, a proper detection of collision can be effected even when an acceleration signal emitted from the acceleration sensor includes a noise.

In addition, according to a second feature of the present invention, there is provided a collision detecting method for detecting a collision of a vehicle on the basis of an acceleration signal produced by an acceleration sensor, wherein the collision of the vehicle is detected when an integration value resulting from an integration of the acceleration signal over a first period of time exceeds a predetermined value, and when a differentiation value of the acceleration signal exceeds a predetermined value.

With the second feature of this invention, the integration value and the differentiation value within the first extremely short period of time after the collision are determined, and the amount of deceleration of the vehicle due to the collision is estimated from the integration value and the differentiation value; thereby, providing the detection of the collision.

Therefore, the detection of the collision can be properly carried out without a time lag. Consequently, when a collision safety device is operated on the basis of such a detection method for the vehicle collision, it is possible to produce a starting signal for the device at an early stage with respect to a time required for the operation of the collision safety device; thereby, allowing the collision safety device to accomplish its function.

In addition to the second feature, a third aspect and feature of the present invention is that the collision of the vehicle is detected regardless of the magnitude of the differentiation value of the acceleration signal, when the integration value resulting from an integration of the acceleration signal over a second period of time longer than the first period of time, exceeds a predetermined value.

With the third feature, it is possible to properly detect even a collision with a small and continuously long shock because if the integration value, resulting from an integration of the acceleration signal over a second period of time being longer than a first period of time, exceeds the predetermined value, the collision of the vehicle is detected regardless of the differentiation value of the acceleration signal.

The above and other objects, features and advantages of the invention will become apparent from a consideration of the following description of the preferred embodiments, taken in conjunction with the accompanying drawings.

BRIEF DESCRIPTION OF THE DRAWINGS

FIGS. 1 to 6 illustrate a first embodiment of the present invention, wherein:

FIG. 1 is a block diagram of a structural arrangement of a collision detection system used for the method of the first embodiment;

FIG. 2 is a graph illustrating a waveform of an acceleration detected by an electrical acceleration sensor;

FIG. 3 is a graph illustrating a waveform passed through a low-pass filter;

FIG. 4 is a graph for explaining a method for calculating a secondary collision speed;

FIG. 5 is a flow chart illustrating the contents for detecting a collision carried out in a collision detection circuit; and FIG. 6 is a graph illustrating a criterion for the detection of a collision;

FIGS. 7 to 10 illustrate a second embodiment of the present invention, wherein;

FIG. 7 is a block diagram of a structural arrangement of a collision detecting system used for the method of the second embodiment;

FIG. 8 is a block diagram of a collision detection circuit;

FIG. 9 is a graph illustrating a principle of a collision prediction logic; and

FIG. 10 is a graph illustrating a region in which a starting signal for an air bag system is produced.

DETAILED DESCRIPTION OF THE PREFERRED EMBODIMENTS

A first embodiment of the present invention will now be described in connection with FIGS. 1 to 6.

Figure 1:
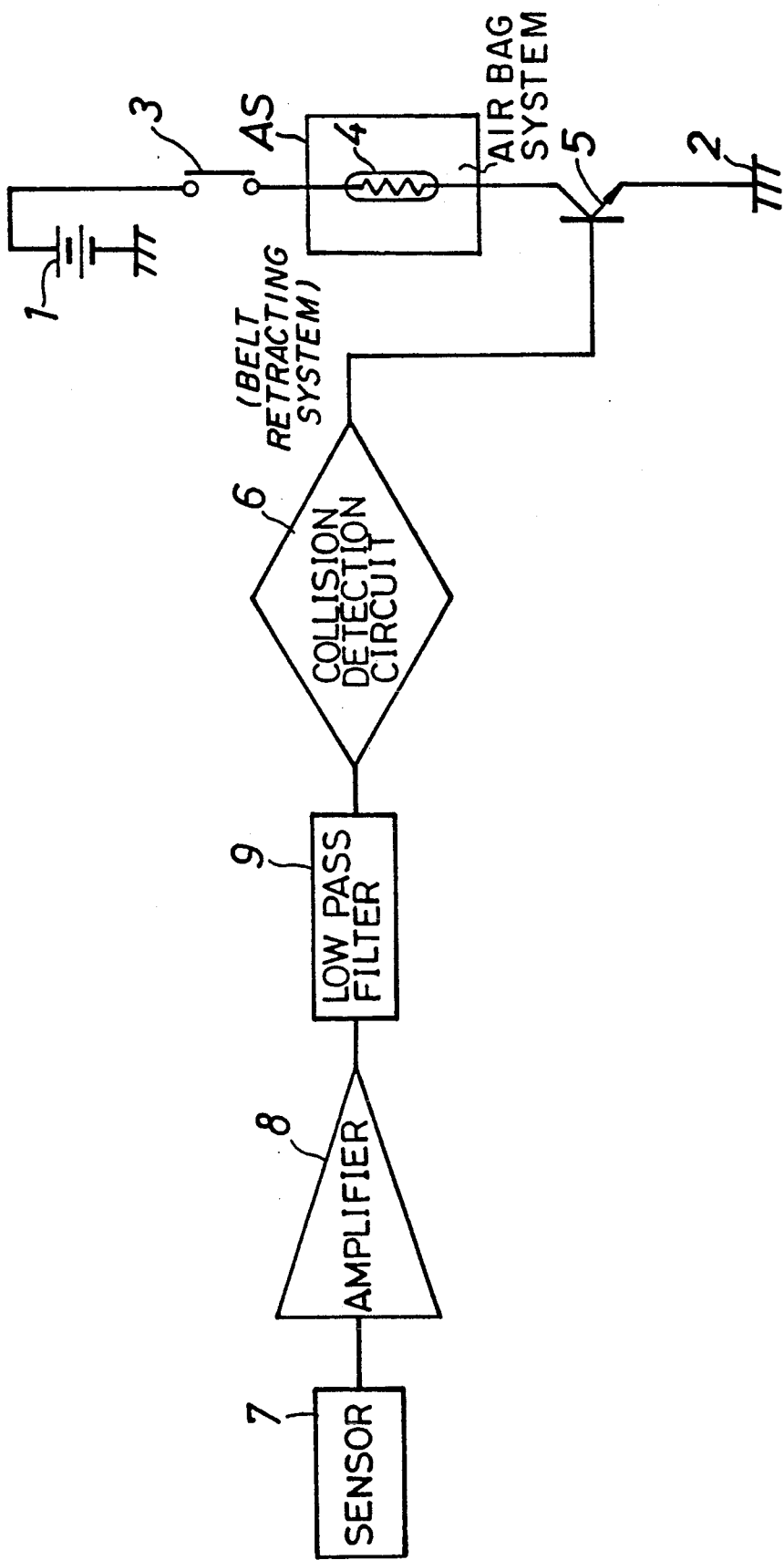

In reference to FIG. 1, a mechanical acceleration sensor 3, a squib 4 of an air back system AS, and a transistor 5 are arranged in series between a voltage source (e.g., a battery) 1 and a ground terminal 2. The air back system AS detects an acceleration generated due to a collision of a vehicle so that when the detected acceleration exceeds a predetermined value, a contact is closed so as to activate the air bag system.

The squib 4 is energized by the voltage source 1 in order to fire a propellant for distending an air bag of the air bag system AS when a collision detection circuit 6 which will be described hereinafter has delivered a starting signal to a base of the transistor 5.

Reference numeral 7 refers to an electrical acceleration sensor which continuously delivers an acceleration signal generated due to a collision of the vehicle in the form of an electrical or voltage signal into which the acceleration is converted by a strain meter. The output signal from the electrical acceleration sensor 7 is amplified by an amplifier 8, and then, subjected to a filtering of high frequency components by a low-pass filter 9. Thereafter, the filtered output signal is outputted from the low-pass filter 9 and inputted into the collision detection circuit 6.

Figure 2:
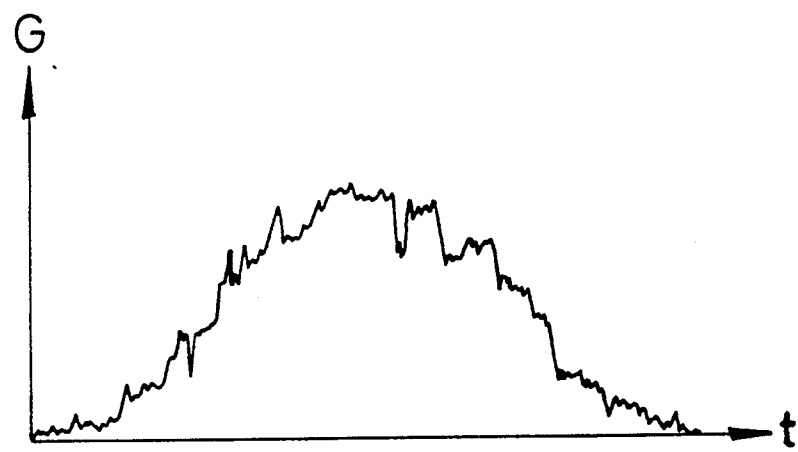
Figure 3:
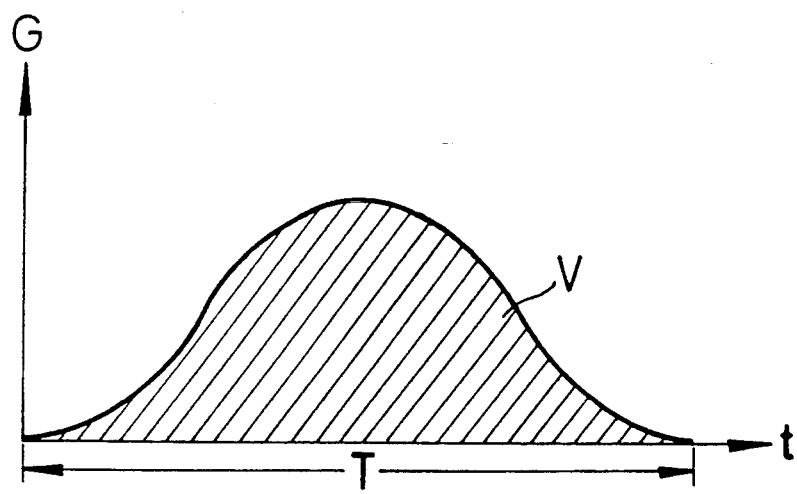

It is experimentally known that the waveform of the acceleration generated due to the collision of the vehicle (i.e., detected by the electrical acceleration sensor 7) is provided from a synthesis of a certain natural frequency component and a high frequency component, as shown in FIG. 2. If the waveform of the acceleration is passed through the low-pass filter 9, a waveform similar to a sine wave (such as shown in FIG. 3) is provided, and it is known that the period T of the waveform is a constant which does not depend upon the magnitude of the acceleration, but depends upon the structure of an individual vehicle body.

Therefore, given that the waveform of the acceleration generated due to the collision of the vehicle is a sine wave, an area V of a region indicated by oblique lines and thus, an amount of deceleration of the vehicle body to the collision can be calculated from the constant T, as well as, an acceleration at an initial stage of the collision and a rate of variation in acceleration dG/dt with time. The magnitude of the area V corresponds to a speed at which an occupant with no seat belt worn thereon is forwardly thrown out due to the collision (i.e., a secondary collision speed) and hence, a value of the area V is used as a parameter for starting the air bag system AS.

Figure 4:
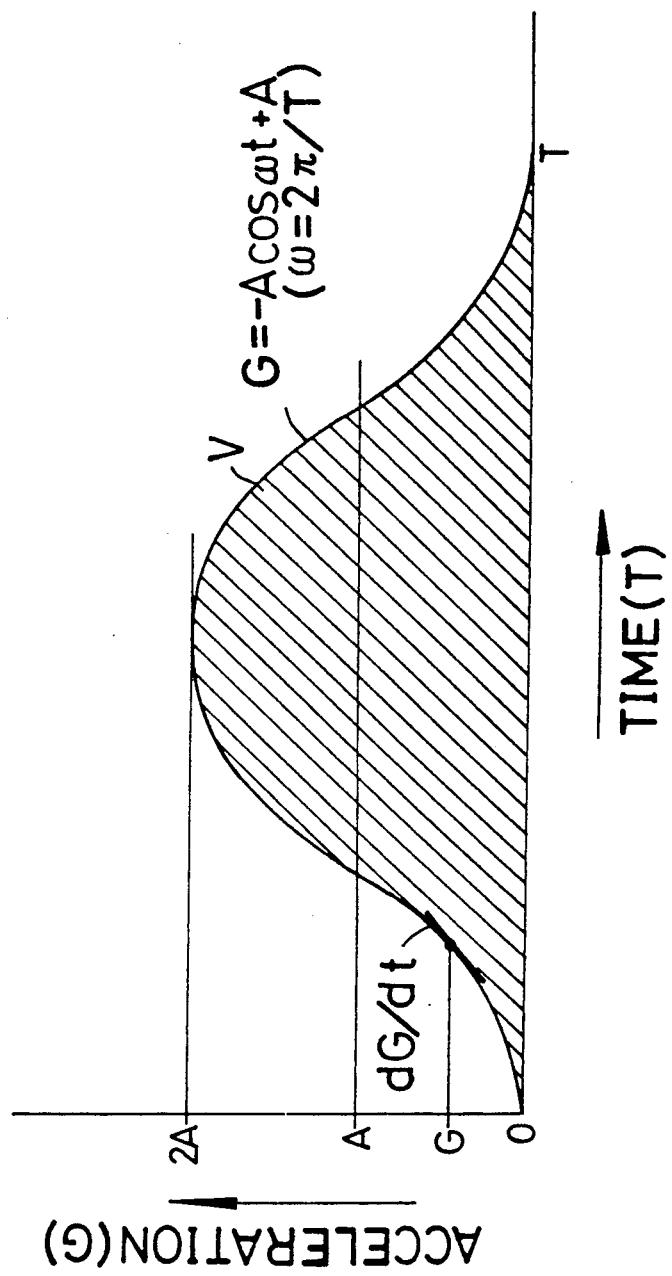

A procedure for calculating the secondary collision speed V from the constant T, the acceleration G, and the rate of variation in acceleration dG/dt with time will be described below in connection with FIG. 4.

Assuming that the waveform of the acceleration G generated due to the collision of the vehicle is a sine wave having an amplitude A and a period T is:

$$G = -A \cos \omega t + A \quad (\omega = 2\pi/T) \tag{1},$$

and the above equation (1) is differentiated with respect to t; thereby, providing the following equation (2):

$$dG/dt = A\omega \sin \omega t \tag{2}.$$

This equation (2) is transformed resulting in the following equation (3):

$$\sin \omega t = (dG/dt)/A\omega \tag{3}.$$

On the other hand, the equation (1) is transformed to give the following equation (4):

$$\cos \omega t = 1 - G/A \tag{4}.$$

The above equations (3) and (4) are substituted into a formula, $\sin^2 \omega t + \cos^2 \omega t = 1$; thereby, providing the following equation:

$$\{(dG/dt)/A\omega\}^2 + (1 - G/A)^2 = 1$$

which is transformed to give the following equation (5):

$$2A = (dG/dt)^2/G\omega^2 + G \tag{5}.$$

Here, an area V of a region (indicated by oblique lines in FIG. 4) is provided as follows as equation (6) by an integration from t=0 to t=T:

$$V = AT \tag{6}.$$

Therefore, an equation (7) is provided as follows:

$$V = (T/2) \cdot \{(dG/dt)^2/G\omega^2 + G\} \tag{7}$$

resulting from a substitution of the equation (5) into the equation (6).

The equation (7) indicates that the speed V of a secondary collision of the occupant can be estimated from a value of the acceleration G at a certain time and a value of the time differentiation dG/dt of the acceleration G.

Figure 5:
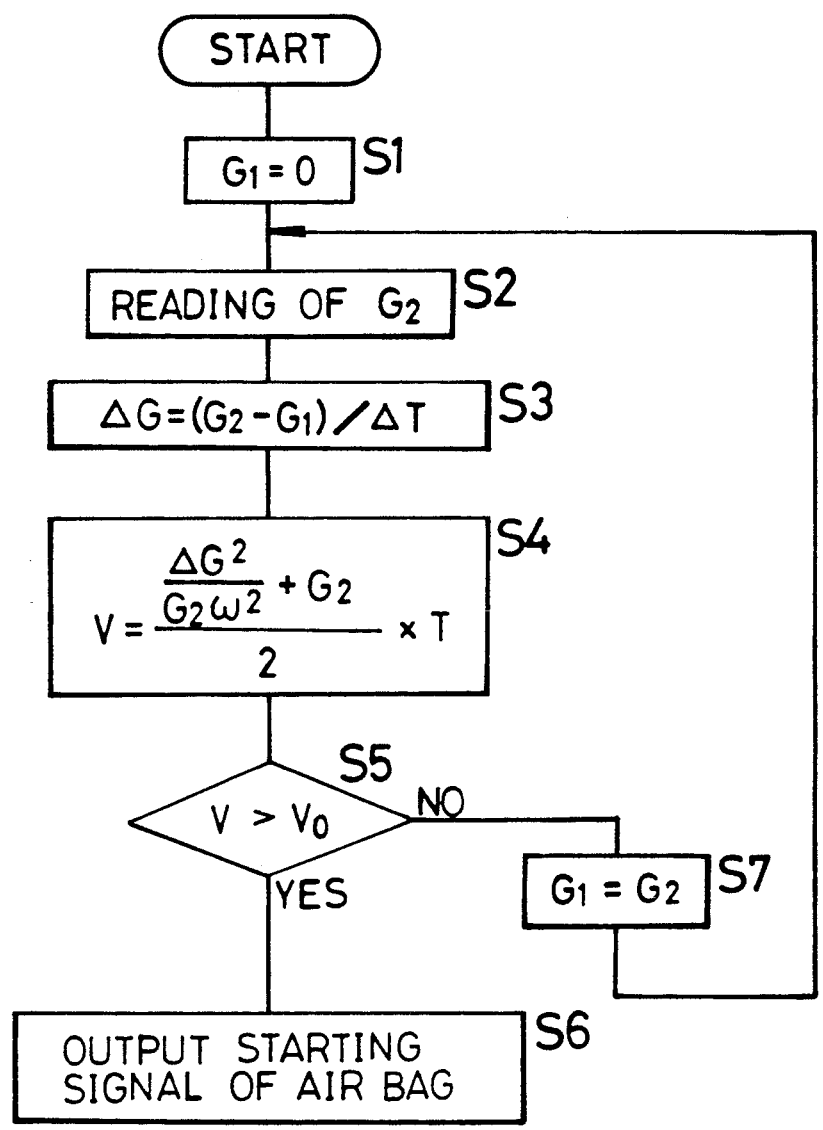

The parameters for determining the collision carried out in the collision detection circuit 6 will be described below in connection with a flow chart shown in FIG. 5.

First, $G_1 = 0$ is established at a step S1 and then, a value $G_2$ of an output signal delivered from the electrical acceleration sensor 7 and passed through the amplifier 8 and the low-pass filter 9 is read at a step S2. At a subsequent step S3, a value of $\Delta G$ corresponding to the rate of variation in acceleration (dG/dt) with time is calculated according to an equation, $\Delta G = (G_2 - G_1)/\Delta T$; wherein, $\Delta T$ is a predetermined sampling time.

At a subsequent step S4, the secondary collision speed V is calculated according to the equation (7). In this case, the above-described $\Delta G$ is used in place of $dG/dt$ in the equation (7), and the above-described $G_2$ is used in place of G in the equation (7). When the secondary collision speed V is calculated in this manner, a calculated value of the secondary collision speed V is compared with a predetermined reference value $V_o$ at a step S5.

Figure 6:
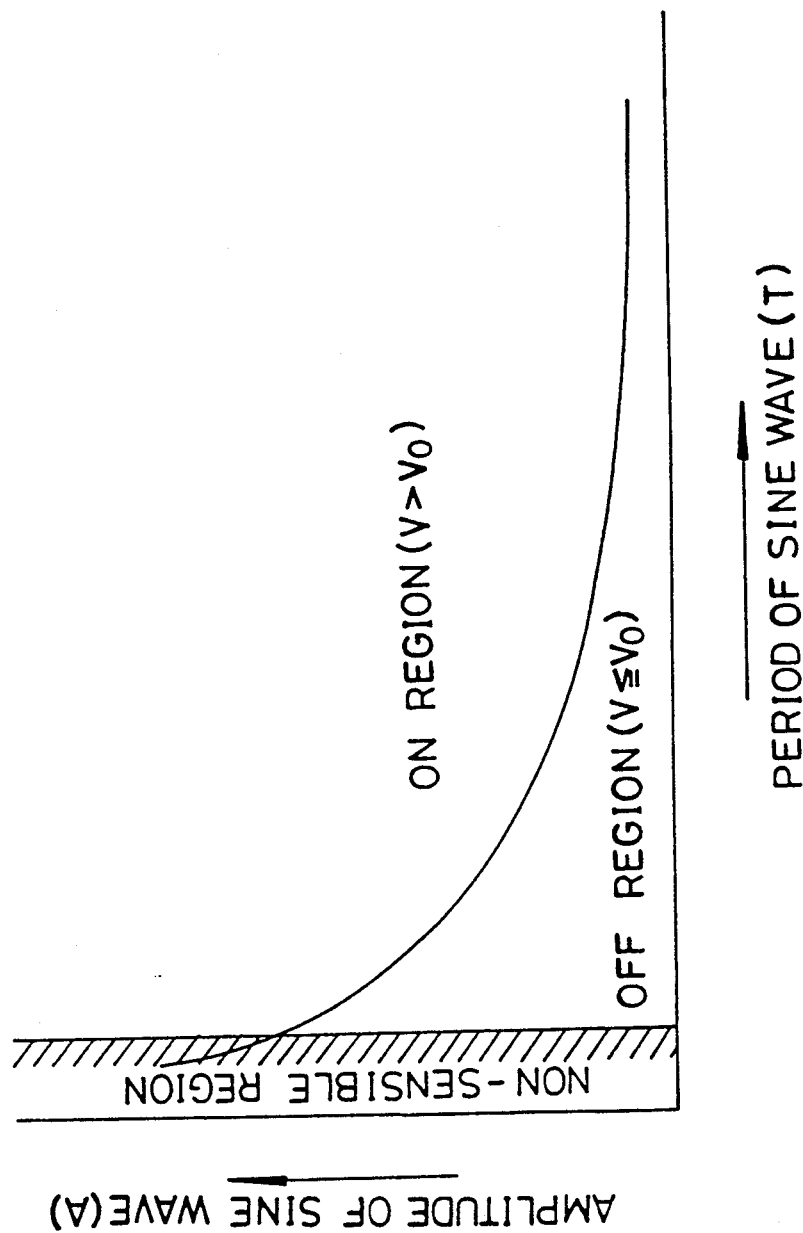

If V exceeds $V_o$, it is decided that the air bag system needs to be activated, and at a step S6, a starting signal for the air bag system AS is produced. Since the value of the secondary collision speed V (i.e., the area of the region indicated by the oblique lines in FIG. 4) depends upon the period T and the a boundary between an ON region and an OFF region of the starting signal for the air bag system AS; amplitude A of the sine wave of the acceleration G and hence, is established, as shown in FIG. 6, such that; the amplitude A is small, when the period T is large; and conversely, the amplitude A is large, when the period T small. If the value of V is equal to or less than the value of $V_o$ at the step S5, $G_2$ is substituted for $G_1$ and the operations following the step S2 are repeated at a step S7.

The vehicle collision can be determined on the basis of an acceleration value immediately after the vehicle collision and a rate of variation in acceleration with respect to time and therefore, the starting signal for the air bag system AS can be produced in a condition whereby a sufficient operational time for distending the air bag is insured.

A second embodiment of the present invention will now be described in connection with FIGS. 7 to 10.

Figure 7:
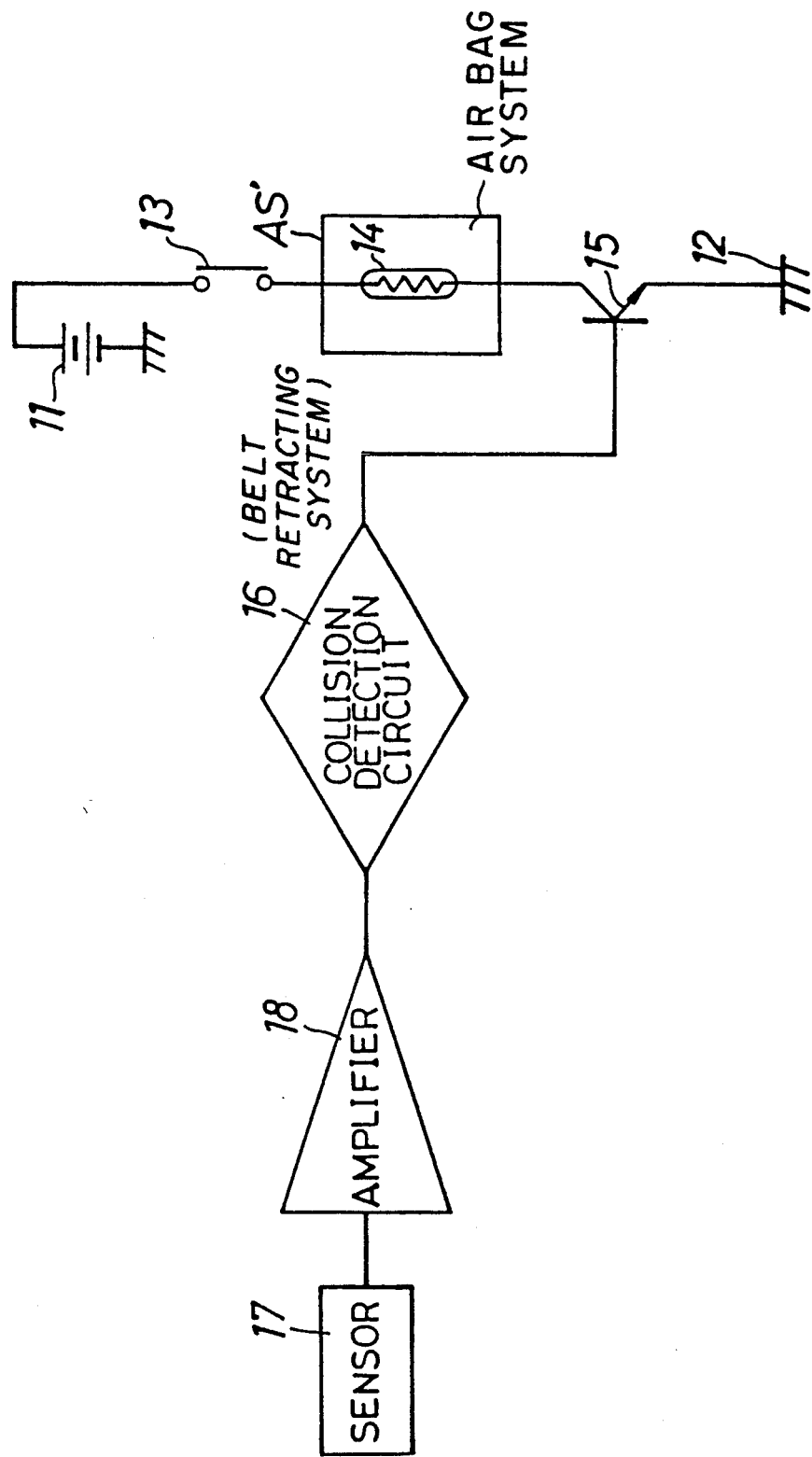

In reference to FIG. 7, a mechanical acceleration sensor 13, a squib 14 of an air bag system AS', and a transistor 15 are arranged in series between a voltage source (e.g., a battery) 11 and a ground terminal 12. The mechanical acceleration sensor 13 detects an acceleration generated due to a collision of a vehicle so that when the detected acceleration exceeds a predetermined value, a contact is closed so as to activate the air bag system AS'. The squib 14 is energized by the voltage source 11 in order to fire a propellant for distending an air bag of the air bag system AS' when the contact of the mechanical acceleration sensor 13 is closed and a collision detection circuit (which will be described hereinafter) has delivered a starting signal to a base of the transistor 15.

Reference numeral 17 refers to an electrical acceleration sensor which continuously delivers an acceleration signal generated due to a collision of the vehicle in the form of an electrical or voltage signal into which the acceleration is converted by a strain meter. The output signal from the electrical acceleration sensor 17 is amplified by an amplifier 18 and inputted as an acceleration signal G into the collision detection circuit 16.

Figure 8:
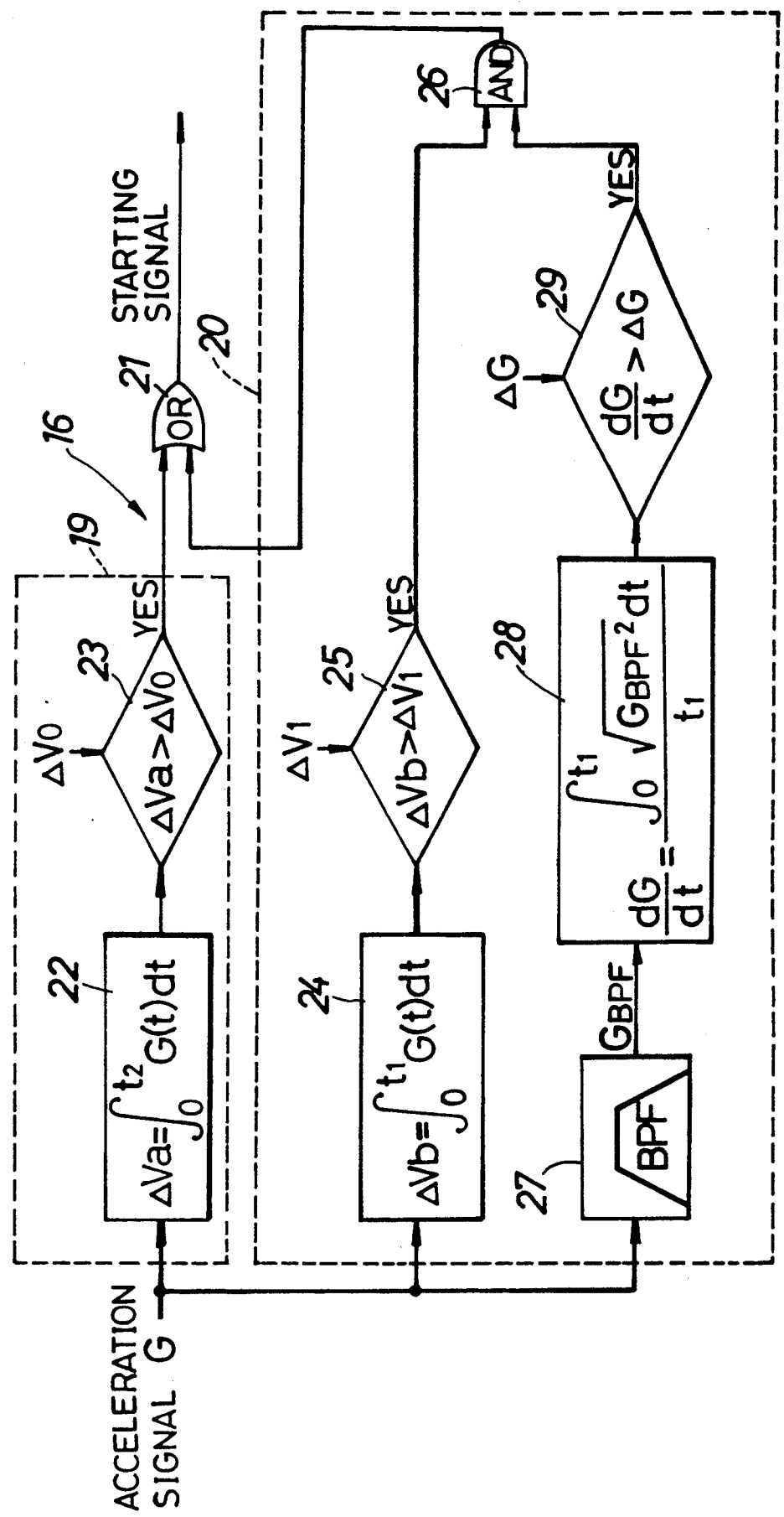

As shown in FIG. 8, the collision detection circuit 16 into which the acceleration signal G is received includes a collision determining logic 19 and a collision prediction logic 20, whereby the logics 19 and 20 are connected to the transistor 15 via an OR gate 21.

An integrating means 22 is provided for the collision determining logic 19, wherein the acceleration signal G is integrated in the integrating means 22 over a relatively long second period of time $t_2$ (e.g., 100 to 150 ms) so that an integration value $\Delta Va$ is calculated. The integration value $\Delta Va$ corresponds to a decrement of a vehicle body speed generated for the second period of time $t_2$ due to a collision (i.e., an increment in a speed of an occupant, arrested by a seat, being thrown forward from the seat toward a steering wheel) when considered on the basis of the vehicle body.

The integration value $\Delta Va$ is calculated over the second period of time $t_2$ and compared with a predetermined reference value $\Delta V_o$ in comparator means 23 at every sampling. If the integration value $\Delta Va$ exceeds the reference value $\Delta Vo$, the starting signal is delivered via the OR gate 21.

The collision determining logic 19 ensures that the starting signal for the air bag system AS' can be reliably delivered even when a collision with a small and continuously long shock has occurred.

Figure 9:
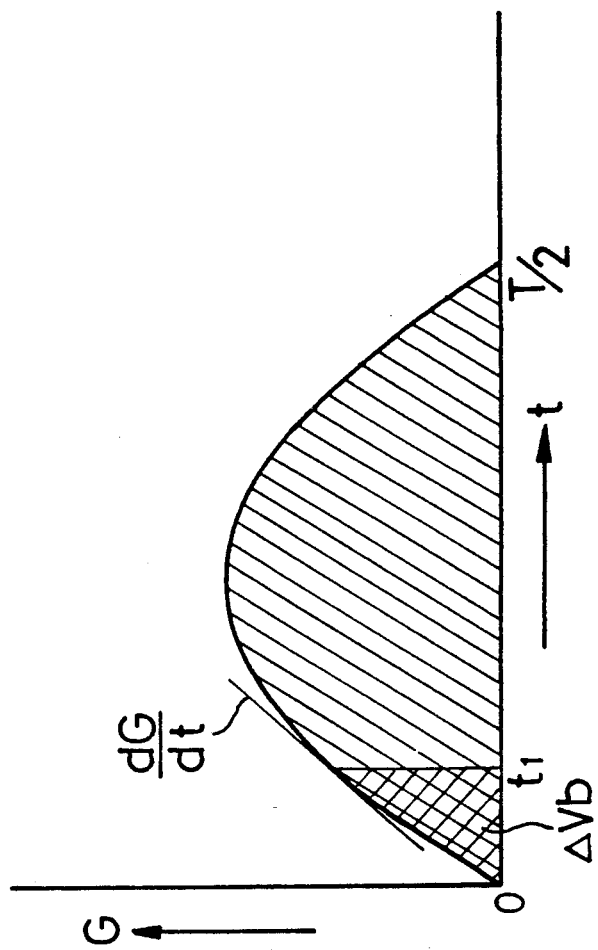

It is experimentally known that the waveform of the acceleration generated due to the collision of the vehicle (i.e., detected by the electrical acceleration sensor 17) is a waveform similar to a sine wave, as shown in FIG. 9; and moreover, the period T in the waveform is a constant which does not depend upon the magnitude of the acceleration, but depends upon the structure of an individual vehicle body.

An area of a region indicated by oblique lines and obtained by an integration of the acceleration signal G over a half period T/2 substantially corresponds to a decrement in speed of the vehicle due to the collision (i.e., a secondary collision speed at which an occupant not arrested by a seat belt is forwardly thrown out with respect to the vehicle). The area of the region indicated by the oblique lines in the waveform of the acceleration signal G increases and decreases as an integration value $\Delta Vb$ (a region indicated by double oblique lines in FIG. 9) resulting from an integration of the acceleration signal G over a relatively short period of time $t_1$ (e.g., 15 to 20 ms) increases and decreases. In addition, the area of the region indicated by the oblique lines in the waveform of the acceleration signal G increases and decreases as an inclination of a tangential line in the waveform (i.e., in the differentiation value $dG/dt$ of the acceleration signal G) increases and decreases. In short, a final secondary collision speed can be predicted to some extent from the integration value $\Delta Vb$ and the differentiation value $dG/dt$ of the acceleration signal G, and the integration value $\Delta Vb$ and the differentiation value $dG/dt$ are used as parameters for the delivery of the starting signal in the collision prediction logic 20 which will be described hereinafter.

In reference back to FIG. 8, an integration means 24 is provided for the collision prediction logic 20, wherein the acceleration signal G is integrated in the integration means 24 over the first period of the time $t_1$ shorter than a second period of time $t_2$ so that an integration value $\Delta Vb$ is calculated. The integration value $\Delta Vb$ corresponds to a decrement in a vehicle body speed generated for the first period of time $t_1$ due to the collision and is used as a parameter for predicting a secondary collision speed of the occupant, as described above. More specifically, the integration value $\Delta Vb$ is compared with a predetermined reference value $\Delta V_1$ in comparator means 25. If the integration value $\Delta Vb$ exceeds the reference value $\Delta V_1$, a signal is supplied to an AND gate 26.

On the other hand, the acceleration signal G is passed through a band-pass filter 27 where undesired components are filtered by a low-pass filter, and $G_{BPF}$ corresponding to a differentiation value of the acceleration signal is provided from a differentiable transfer function of a high-pass filter. Subsequently, the $G_{BPF}$ is averaged over the first period of time $t_1$ by average value calculating means 28 so that a differentiation value dG/dt of the acceleration G is calculated. This differentiation value, dG/dt, is also used as a parameter for predicting the secondary collision speed of the occupant and is compared with a predetermined reference value ΔG in a comparator means 29. If the differentiation value dG/dt exceeds the reference value ΔG, a signal is supplied to the AND gate 26.

When the signals have been received by the AND gate 26 from the comparator means 25 and 29, the AND gate 26 produces the starting signal for the air bag system AS'. As can be seen from a graph shown in FIG. 10, a region in which the AND gate 26 produces the starting signal is a region A in which the integration value ΔVb exceeds the reference value ΔV$_1$ and the differentiation value dG/dt exceeds the reference value ΔG. In contrast, when only a conventional mechanical acceleration sensor is used, the starting signal is produced in a region B.

Figure 10:
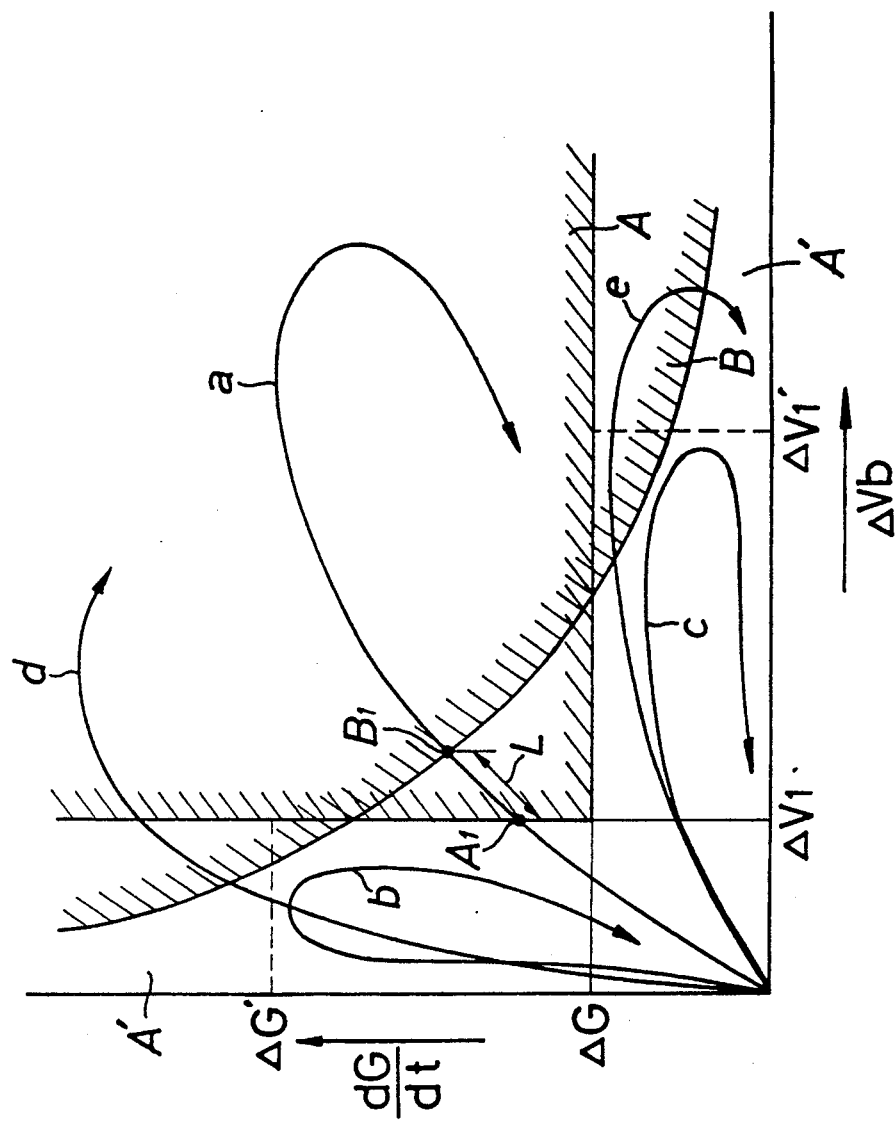

A variation in integration value ΔVb and the differentiation value dG/dt due to a common collision of the vehicle is a locus (such as shown by a in FIG. 10). In the method of the present invention, the starting signal is produced at a point A$_1$ which is an intersection between the locus a and a boundary of the region A, whereas in the conventional method, the starting signal is produced at a point B$_1$ which is an intersection between the locus a and a boundary of the region B. In the conventional collision detecting method, there is eventually a time lag corresponding to L in FIG. 10 from the point A$_1$ in the method of the present invention.

In order to ensure that the air bag system AS' is not operated when the vehicle rides on a curb (see, locus b) or when a collision with a small shock occurs at a low speed (see, locus c), it is required in the conventional collision detecting method significantly displace the region B away from an origin; thereby, resulting in a further delay in the delivery of the starting signal. In the collision detecting method of the present invention, however, the riding of the vehicle on the curb and any undesired operation of the air bag system AS' upon the collision at a slow speed can be avoided even if the region A is established in a relatively extensive manner.

In some cases, the integration value ΔVb and the differentiation value dG/dt may describe a locus (such as a locus d) depending upon the type of collision, but in such cases, there is a possibility of a delay in the time for delivery the starting signal.

In addition, when the integration value ΔVb and the differentiation value dG/dt describe a locus (such as a locus e), there is a possibility of the starting signal not being produced. For this reason, in a relationship between the integration value ΔVb and the differentiation value dG/dt, a region (i.e., region A' in FIG. 10) larger than predetermined values ΔV$_1$' and ΔG' may be added to the region A so that the starting signal may be produced in both the regions A and A'.

In place of the passing of the acceleration signal G through the band-pass filter 27 to provide the $G_{BPF}$ corresponding to a differentiation value of the acceleration signal G, the acceleration signal G may be passed through a low-pass filter where it is directly differentiated so as to provide a differentiation value.

Although the embodiments of the present invention have been described above, it will be understood that the present invention is not limited to these embodiments, and various minor modifications in design may be made without departing from the scope of the invention defined in the claims.

For example, the present invention is not limited to the air bag system, but is also applicable to belt retraction systems.

What is claimed is:

1. A method for detecting a collision of a vehicle body on the basis of an acceleration signal produced by an acceleration sensor and for starting a collision safety device based on a detected collision of said vehicle body, said method comprising the steps of:

detecting the acceleration signal by the acceleration sensor;

estimating a reduction in the amount of speed of the vehicle body due to a collision at a first time point by the acceleration signal from said acceleration sensor and a rate of time variation in the acceleration signal at a second time point earlier than said first time point;

detecting the collision of the vehicle body when said reduction in the amount of speed exceeds a predetermined value, wherein said detecting step includes the steps of inputting into a comparator said reduction in the amount of speed and comparing thereof within said comparator with said predetermined value; and starting a safety collision device based on the detected collision.

2. A method according to claim 1, wherein the step for estimating the reduction amount of speed of the vehicle body includes the step of utilizing said acceleration signal from said acceleration sensor after passage of said acceleration signal through a low-pass filter.

3. A method according to claim 1, further comprising a step of outputting a starting signal to a collision safety device, wherein said collision safety device operates in response to the collision of the vehicle body.

4. A method according to claim 3, wherein said collision safety device is an air bag system.

5. A method according to claim 3, wherein said collision safety device is a belt retracting system.

6. A method according to claim 1 or 2, wherein the step of estimating said reduction amount of speed of said vehicle body includes the step of estimating said reduction amount of speed of the vehicle body according to the following equation:

$$V = (T/2) \cdot \{\Delta G^2 / G\omega^2 + G\},$$

wherein

V is the reduction amount of speed of the vehicle body,

T is a period of the acceleration signal,

G is an acceleration,

ΔG is a variation in acceleration in a predetermined time before the second time point, and ω is $2\pi/T$.

7. A method for detecting a collision of a vehicle on the basis of an acceleration signal produced by an acceleration sensor and for starting a collision safety device based on a detected collision of said vehicle body, said method comprising the steps of:

detecting said acceleration signal by said acceleration sensor;

integrating in an integrator said acceleration signal over a first period of time, and outputting an integration value;

comparing in a first comparing means said integration value with a first predetermined value;

detecting when said first integration value resulting from integration of the acceleration signal over said first period of time to a time point exceeds the first predetermined value and outputting a first resulting signal;

differentiating in a differentiation said acceleration signal, and outputting a differentiation value;

comparing in a second comparing means said differentiation value with a second predetermined value;

detecting when a differentiating value of the acceleration signal at said time point exceeds said second predetermined value and outputting a second resulting signal;

detecting said collision of said vehicle by detecting both first and second resulting signals; and starting a safety collision device based on the detected collision.

8. A method according to claim 7, wherein the step of detecting said collision of said vehicle includes detection thereof regardless of a magnitude of said differentiation value of said acceleration signal when a second integration value resulting from integration of said acceleration signal over a second period of time exceeds a third predetermined value, said second period of time being longer than said first period of time.

9. A method according to claim 7, further comprising a step of outputting a starting signal to a collision safety device, wherein said collision safety device operates in response to the collision of the vehicle.

10. A collision detecting method according to claim 9, wherein said collision safety device is an air bag system.

11. A method according to claim 9, wherein said collision safety device is a belt retracting system.

12. A method for detecting a collision of a vehicle body on the basis of an acceleration signal produced by an acceleration sensor and for starting a collision safety device based on a detected collision of said vehicle body, said method comprising the steps of:

(1) detecting said acceleration signal by said acceleration sensor;

(2) determining the collision of the vehicle body, said determining step including the steps of: integrating in a first integrator the acceleration signal over a first period of time, comparing in a first comparator a first integration value with a first predetermined value, and determining whether said first integration value resulting therefrom exceeds said first predetermined value, and outputting a first resulting signal;

(3) predicting the collision of the vehicle body, said predicting step includes the steps of:

(a) integrating in a second integrator the acceleration signal over a second period of time, comparing in second comparator a second integration value with a second predetermined value, and determining whether said second integration value resulting therefrom exceeds said second predetermined value and outputting a second resulting signal, and (b) filtering with a band pass filter the acceleration signal, differentiating in a differentiator the filtered acceleration signal, comparing in a third comparator a differentiation value with a third predetermined value, and determining whether the differentiated value resulting therefrom exceeds the third predetermined value, wherein detecting of said collision of said vehicle body is dependent on at least one of: (a) said first resulting signal and (b) said second and third resulting signals; and (4) starting a safety collision device based on the detected collision.

13. A method according to claim 12, wherein the step of determining the collision of the vehicle body by integrating the acceleration signal includes the step of determining a decrement of a vehicle body speed generated for said first period of time.

14. A method according to claim 12, wherein the step of integrating the acceleration signal over said second period of time includes the step of determining a decrement of a vehicle body speed generated for said second period of time.

15. A method according to claim 12, further comprising a step of outputting a starting signal and inputting into an OR gate for starting said a collision safety device which is dependent on said first resulting signal from the step of determining whether said integration value exceeds said predetermined value.

16. A method according to claim 15,
wherein said second resulting signal from the step of determining whether said signal integration value exceeds said second predetermined value is inputted into an AND gate, wherein said third resulting signal from the step of determining a differentiated value exceeds said third predetermined value is inputted into said AND gate, and wherein said second resulting signal and said third resulting signal are inputted into said OR gate so as to determine whether said starting signal for starting said collision safety device is to be outputted.

17. A method according to claim 16, wherein said safety collision device is an air bag system.

18. A method according to claim 16, wherein said safety collision device is a belt retracting system.

* * * * *